United States Patent Office 3,770,691
Patented Nov. 6, 1973

3,770,691
CURABLE COMPOSITION COMPRISING CARBON FIBERS AND A MIXTURE OF ALIPHATICALLY UNSATURATED IMIDES
Joseph R. McLoughlin, Burnt Hills, N.Y., assignor to General Electric Company
No Drawing. Continuation of abandoned application Ser. No. 86,287, Nov. 2, 1970. This application Jan. 31, 1972, Ser. No. 222,334
Int. Cl. C08g 51/08, 51/10
U.S. Cl. 260—37 N    3 Claims

ABSTRACT OF THE DISCLOSURE

A method is provided for making curable compositions in the form of carbon fiber prepregs or laminates using certain aliphatically unsaturated imides. The curable compositions can be converted by the use of heat and pressure to make high strength composites having a pre-determined shape.

---

This application is a continuation of my copending application Ser. No. 86,287, now abandoned, filed Nov. 2, 1970 and assigned to the same assignee as the present invention.

The present invention relates to carbon fiber prepregs comprised of carbon fibers treated with an aliphatically unsaturated imide, composites derived therefrom, and methods for making such materials.

High strength composites consisting of an organic matrix and a reinforcing fiber, such as glass fiber, boron fiber, carbon fiber, etc., have been viewed with considerable interest by the aircraft industry and other industries interested in the employment of materials convertible to lightweight shaped structures having an unusually high tensile strength and elastic modulus. Various combinations of anyone of the aforementioned fibers and organic resins, such as epoxy resins and polyimides, have been evaluated extensively because these materials have provided composites having unusually high strength.

Although a variety of organic resins can be employed to make valuable high strength composites, the full utilization of these resins as matrices for composites is often not realized because of inherent resin limitations. Epoxy resins, for example, lack high temperature stability. Polyimides, such as taught by Edwards' Pat. 2,710,853 can provide composites having high temperature stability, but do not have the processing advantages provided by epoxy resins. In addition, chemically combined water released during the cure of such reinforced polyimides can produce voids in the matrix and reduce the strength of the resulting composite.

Recently, as shown by Lubowitz patent 3,528,950, certain temperature resistant polyimide polymers have been developed having improved processing characteristics over the polyimides of Edwards' Pat. 2,710,853. In addition, these materials cure without formation of water, since cure is achieved through terminal aliphatically unsaturated linkages. Even though the aforementioned polyimide resins of Lubowitz afford fabricators significant advantages over many of the available organic resins, these aliphatically unsaturated polyimides can require cure temperatures of up to about 350° C. This can restrict the employment of such resin by fabricators using molding equipment, such as steam molding equipment, incapable of achieving such temperatures.

It has now been discovered that carbon fiber prepregs and laminates, consisting essentially of carbon fibers having a pre-determined orientation, treated with certain aliphatically unsaturated imides, defined hereinafter, can be converted to high strength composites at temperatures considerably below 350° C. As a result, additional advantages are now offered to fabricators of high strength polyimide composites.

There is provided by the present invention, curable compositions comprising carbon fibers oriented in a pre-determined manner which have been treated with an aliphatically unsaturated imide selected from the class consisting of (a) a mixture containing as essential ingredients of by weight from 5 to 95% of a maleimide of the formula, (1) 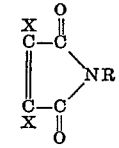

and from 5 to 95% of a bis-imide of the formula, (2) 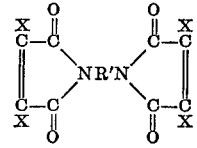

and
(b) a reaction product of from 1 to 4 moles of the bis-imide (a), per mole of an aryl diamine of the formula, (3)    $H_2NR''NH_2$ where R is a member selected from the class consisting of hydrogen, monovalent hydrocarbon radicals and halogenated, monovalent hydrocarbon radicals, R' and R" can be the same or different, and are members selected from the class consisting of divalent organic radicals of at least 2 carbon atoms, and X is a monovalent radical selected from hydrogen, methyl, chloro and mixtures thereof.

Radicals included by R of Formula 1, are for example, hydrogen, monovalent hydrocarbon radicals, for instance, alkyl (e.g. methyl, ethyl, propyl, isopropyl, butyl, decyl, dodecyl, etc.); aryl (e.g. phenyl, dichlorophenyl, pentabromobiphenyl, tolyl, ethylphenyl, naphthyl, anthracyl, etc.); aralkyl (e.g. benzyl, phenylethyl, phenylpropyl, etc.); unsaturated aliphatic including unsaturated cycloaliphatic (e.g. vinyl, allyl, methallyl, isobutylenyl, crotonyl, cyclopentyl, cyclopentenyil, cyclohexyl, cyclohenenyl, ethynyl, propynyl, etc.); tolyl, ethylphenyl, etc.

Radicals included by R' and R" of Formulas 2 and 3 include but are not limited to divalent hydrocarbon radicals of up to 40 carbon atoms, and divalent groups consisting of two aryl residues attached to each other through the medium of a member selected from the class consisting of an alkylene radical of from 1 to 10 carbon atoms, $$-S-, \ -SO_2-, \ -\overset{O}{\underset{\|}{C}}-, \text{ and } -O-,$$

etc. R' and R" are for example, divalent unsaturated alalkylene radicals of up to 40 carbon atoms, for instance 1 to 10 (e.g. ethylene, proplene, butylene, isopropylidene, hexylene, cyclohexylene, etc.), the divalent radical of diethylene oxide of the formula $-CH_2-CH_2-O-CH_2-CH_2-$ etc.); arylene (e.g. m-phenylene, p-phenylene, p,p'-biphenylene, dichlorophenylene, biphenylene methylene of the formula

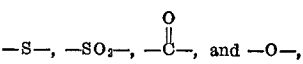

biphenylene oxide, biphenylene sulfone, biphenylene sulfide, keto biphenylene of the formula

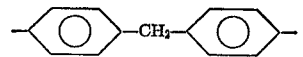

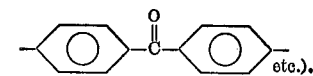

Where the arylene radicals can be attached to nitrogen through the ortho, meta or para positions.

Included by the maleimides of Formula 1 are for example, maleimide, N-methyl maleimide, N-ethyl maleimide, N-phenyl maleimide, N-n-butyl maleimide, N-o-tolyl maleimide, N-o-biphenyl maleimide, N-monochlorophenyl maleimide, N-vinyl maleimide, N-allyl maleimide, N-cyclohexyl maleimide, N-decyl maleimide, N-propynyl maleimide, etc. Some of the bis-imides of Formula 2 which can be employed with the aryl diamine of Formula 3 are for example, N,N'-ethylene-bis-maleimide,
N,N'-m-phenylene-bis-maleimide,
N,N'-p-phenylene-bis-maleimide,
N,N'-hexamethylene-bis-maleimide,
N,N'-p,p'-diphenyldimethylsilyl-bis-maleimide,
N,N'-p,p'-diphenylmethane-bis-maleimide,
N,N'-p,p'-diphenylether-bis-maleimide,
N,N'-p,p'-diphenylthioether-bis-maleimide,
N,N'-diphenylsulfone-bis-maleimide,
N,N'-dicyclohexyl-methane-bis-maleimide,
N,N'-m-xylylene-bis-maleimide,
N,N'-p,p'-benzophenone-bis-maleimide,
N,N'-(3,3'-dichloro-p,p'-biphenylene) bis-maleimide,
N,N'-p,p'-diphenyl ether-bis-endomethylene-tetrahydrophthalimide,
N,N'-p,p'-diphenyl-methane-bis-tetrahydrophthalimide, etc.

Halogenated derivatives of such bis-imides where halogen is on the anhydride portion of the imide and on aryl nucleus can also be employed without departing from the scope of the invention, are for example, N,N'-(3,3'-dichloro-4,4'-bi-phenyloxy-bis-maleimide,
N,N'-(3,3'-dibromo-4,4'-diphenyl-methane)-bis-dichloromaleimide,
N,N'-4,4'-diphenylmethane-bis-hexachloroendomethylenetetrahydrophthalimide, etc.

Among the organic diamines of Formula 3, which can be employed in the practice of the invention are for example, metaphenylene diamine; para-phenylene diamine; 4,4'-diamino-diamino-3,5,3',5'-tetramethyl-diphenyl methane, 4,4' diamino-diphenyl propane; 4,4'-diamino-diphenyl methane; 4,4'-diamino-diphenyl sulfide; 4,4'-diamino-diphenyl sulfone; 3,3'-diamino-diphenyl sulfone; 4,4'-diamino-diphenyl ether; 4,4'-diamino-3,5,3',5'-tetrachlorodiphenyl methane; 2,6-diamino-pyridine; bis-(4-aminophenyl)diethyl silane; bis-(4-amino-phenyl)phosphine oxide; bis-(4-aminophenyl)-N-methyl-amine; 1,5-diamino-naphthalene; 3,3'-dimethyl-4,4'-diamino-biphenyl; 3,3'-dimethoxy benzidine; 2,4-bis-(beta-amino-t-butyl) toluene; bis-(para-beta-amino-t-butylphenyl) ether; para-bis-(2-methyl-4-amino-pentyl)benzene; para-bis-(1,1-dimethyl-5-amino-pentyl) benzene; m-xylylene diamine; p-xylylene diamine; bis(para-amino-cyclohexyl) methane; hexamethylene diamine; heptamethylene diamine; octamethylene diamine; nonamethylene diamine; decamethylene diamine; 3-methylheptamethylene diamine; 4,4-dimethylheptamethylene diamine; 2,11-diamino-docecane; 1,2-bis-(3-aminopropoxy) ethane; 2,2-dimethyl propylene diamine; 3-methoxy-hexamethylene diamine; 2,5-dimethylhexamethylene diamine; 2,5-dimethylheptamethylene diamine; 5-methylnonamethylene diamine; 1,4-diamino-cyclohexane; 1,12-diamino-octadecane;

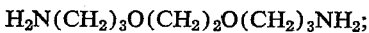

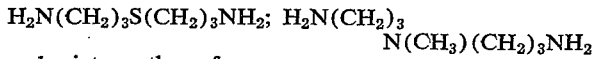

and mixtures thereof.

Carbon fibers which can be employed in the practice of the invention includes fiber, derived from carbonized polyacrylonitrile, cellulose acetate, cellulose nitrate, etc. such as Morganite Type I and II, Thornel 25, 40, 50 etc., fiber made from molten polyvinyl chloride pitch, etc.

Further examples of carbon fiber are shown in Johnson et al. Pat. 3,412,062, and polyacetylene fiber of Sliva et al. (RD-2895) filed concurrently herewith, and assigned to the same assignee as the present invention. Polyacetylenes useful for making such carbon fiber are further shown by Hay Pats. 3,300,456; 3,332,916 and 3,519,611 assigned to the same assignee as the present invention, and French Pat. 1,557,383. These polyacetylenes are extruded in the form of a blend, and thereafter heated to a temperature up to about 2000° C. to produce a fiber having an elastic modulus of up to about $15 \times 10^6$ p.s.i. The fiber then can be heated to a temperature of up to about 3,300° C., while under a tension of up to about $1 \times 10^5$ p.s.i. to produce a high strength, high modulus fiber useful in making pregs and composites in accordance with the present invention.

In accordance with the practice of the invention, a carbon fiber prepreg is made by treating carbon fiber, preferably in the form of a carbon fiber tow or bundle, with aliphatically unsaturated imide, referred to hereinafter as "imide" or "imide resin." The imide can be applied in the form of a solution or melt. For example, the carbon fiber can be treated by applying the resin solution or melt onto the surface of the fiber until the resin is uniformly distributed thereon. Evaporation of the solvent, or cooling of the melt results in the production of a carbon fiber prepreg which can have from about 10% to 50% by weight of resin, based on the total weight of resin and carbon fiber; preferably from 20% to 35% of resin. If desired, several carbon fiber tows can be laid side by side onto a suitable substrate and covered uniformly with the resin followed by the evaporation of the solvent or cooling of the substrate.

The skilled in the art know that carbon fiber prepregs can have carbon fibers oriented substantially parallel to each other. The prepregs can be cut to any desired size and assembled together to a particular shape such as a sheet, prior to being molded.

Various solvents can be employed with the imides employed in the practice of the invention to treat carbon fiber such as methylene dichloride, dimethyl formamide, dimethylacetamide, and N-methyl-pyrrolidone, etc. Removal of solvent can be facilitated during molding of the prepreg by the employment of a vacuum. Molding can be effected at temperatures in the range of from 150° C. to 200° C., while utilizing a pressure of 10 p.s.i. to 1000 p.s.i.

The carbon fiber prepregs and sheets of the present invention can be employed to make lightweight, high strength finished parts which can be molded to a specific shape, such as the parts of airplanes, boats, etc.

In order that those skilled in the art will be better able to practice the invention, the following examples are given by way of illustration and not by way of limitation. All parts are by weight.

EXAMPLE 1

A 6" bundle of about 10,000 carbon fibers having an average diameter of about 0.5 mil was treated with an 11½% methylenedichloride solution of an imide resin consisting of a mixture of n-phenyl-maleimide and bis-maleimide. There was employed in the resin mixture a proportion of about 3 parts of n-phenyl-maleimide, per part of N,N'-p,p'-diphenylmethane - bis - maleimide. After impregnating the carbon fiber with the aforementioned resin solution, the treated carbon fiber was air dried 5 minutes at 35° C., and then cut into 1½" pieces. The pieces were then placed in a mold and heated for 5 minutes at 100° C. utilizing a vacuum to draw off residual solvent. There was obtained a curable prepreg having about 30% resin based on the total weight of carbon fiber, resin and residual solvent. The mold was then closed and the sample cured for 30 minutes at 120° C., and 30 minutes at 150° C. There was obtained finished bars having an average flexural strength at 25° C. of about $270 \times 10^3$ p.s.i. The bars also had an average modulus of elasticity of about 18×10⁶ p.s.i. The cured bars were then measured at 200° C. and were found to have an average flexural strength of about 125×10³ p.s.i., and an average elastic modulus of about 17×10⁶ p.s.i. At 250° C. the average flexural strength was about 87×10³ p.s.i. and elastic modulus was about 15×10⁶ p.s.i.

EXAMPLE 2

A mixture of 5 parts of N,N'-p,p'-diphenylmethane-bis-maleimide and 2 parts of p,p'-diamino diphenylmethane is heated with stirring for approximately 30 minutes at 160° C. The resulting product is allowed to cool to room temperature and then pulverized to a finally divided state. A 12½% solution of the pulverized product is then prepared employing N-methyl-pyrrolidone as the solvent.

A 6" tow of the carbon fibers is impregnated with the above solution and then dried for about 8 minutes at 100° C. The resulting product having about 30% by weight resin based on the total weight of carbon fiber, resin and residual solvent is then cut up into 1½" lengths and placed in a mold. The mold is evacuated for 10 minutes at 120° C. to 150° C. The product is then molded for 1 hour at 250° C. There is obtained molded samples having an average tensile p.s.i. of about 320×10³ p.s.i., and an average elastic modulus of about 19×10⁶ p.s.i. The molded samples also had an average interlaminer shear of about 12.5×10³ p.s.i.

EXAMPLE 3

A similar resin is employed as described in Example 2, except the mixture of the bis-maleimide and p,p'-diamino diphenyl methane is heated at about 169° C. for 15 minutes with nitrogen bubbling through the melt. The product was then ground up and dissolved in N-methyl pyrrolidone to produce a 12½% solution.

The product was then allowed to dry in air as described in Example 2, and cut into 1½" lengths and molded at 500 p.s.i. for 10 to 20 minutes in a vacuum at 150° C., and 10 to 20 minutes at 170° C., and an additional 1 hour at 250° C. There was obtained molded samples having an average of about 35×10⁴ p.s.i. flexural strength, and about 2×10⁷ p.s.i. modulus.

EXAMPLE 4

A mixture of equal parts of N-phenyl maleimide and N,N'-p,p'-diphenylmethane-bis-maleimide is heated for 6 minutes at 165° C. There is added one part of methylene dianiline per part of N,N'-p,p'-diphenylmethane-bis-maleimide to the resulting mixture. The mixture is heated for an additional 5 minutes. The resulting product is allowed to cool to room temperature. It is then dissolved in ethylene dichloride to produce a 12% solution.

Carbon fiber tows are impregnated with the above solution and the treated fibers are heated in air for 5 minutes at 125° C. They are then cut up into 1½" lengths and placed in a mold under vacuum for 15 minutes at 125° C., and 500 p.s.i. pressure applied for about 15 minutes at 160° C., and 1 hour at 250° C. The molded samples are found to have an average tensile strength of about 3.15×10⁵ p.s.i., and a flexural strength of about 20×10⁶ p.s.i.

EXAMPLE 5

A three foot carbon fiber tow was passed through a melt of a mixture of N,N'-p,p'-diphenylmethane-bis-maleimide and P,P'-diamino-diphenylmethane utilizing a ratio of about 2½ parts of the bis-maleimide per part of the methylene dianiline. A vacuum was applied during the treatment of the carbon fiber, resulting in the production of a treated product having an average of about 30% of resin and 70% of carbon fiber.

The above prepreg is molded as described in Example 2, to produce a composite having substantially the same physical properties as described in Example 2.

Although the above examples are limited to only a few of the very many variables employed in the practice of the present invention, it should be understood that the curable compositions of the present invention can include any of the unsaturated imides shown by Formulas 1 and 2, and the aryl diamine of Formula 3.

What I claim as new and desire to secure by Letters Patent of the United States is:

1. Curable compositions consisting essentially of carbon fibers oriented in a predetermined manner which have been treated with an aliphatically unsaturated imide in the form of a mixture comprising:

from 5 to 95 percent by weight of a maleimide of the formula,

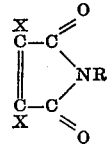

and from 95 to 5% by weight of a bismaleimide of the formula,

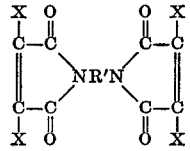

and where R is a member selected from the class consisting of hydrogen, monovalent hydrocarbon radicals and halogenated, monovalent hydrocarbon radicals, R' is selected from divalent organic radicals having at least two carbon atoms, and X is a monovalent radical selected from hydrogen, methyl, chloro and mixtures thereof.

2. A curable composition in accordance with claim 1, in the form of a carbon fiber prepreg having from about 10 to 50% by weight of said aliphatically unsaturated imide.

3. A curable composition in accordance with claim 1, where said maleimide is N-phenylmaleimide and said bisimide is N,N'-p,p'-diphenylmethane-bis-maleimide.

References Cited

UNITED STATES PATENTS

| | | | |
|---|---|---|---|
| 3,137,678 | 6/1964 | Joulset | 260—78 |
| 3,562,223 | 2/1971 | Bargain | 260—78 |
| 3,554,969 | 1/1971 | Long | 260—47 |
| 3,412,062 | 11/1968 | Johnson | 260—37 |
| 3,533,996 | 10/1970 | Gundschober | 260—47 |
| 3,352,832 | 11/1967 | Barr | 260—78 |
| 3,651,012 | 4/1972 | Holub | 260—47 UA |
| 3,717,615 | 7/1973 | Holub | 260—47 X |

OTHER REFERENCES

Modern Plastics, 1968, vol. 45, No. 1A.

ALLAN LIEBERMAN, Primary Examiner

R. ZAITLEN, Assistant Examiner

U.S. Cl. X.R.

260—857 PI